Oct. 18, 1932.　　F. H. RAGAN　　1,883,318
BRAKE OPERATING MECHANISM
Filed Dec. 27, 1928　　2 Sheets-Sheet 1
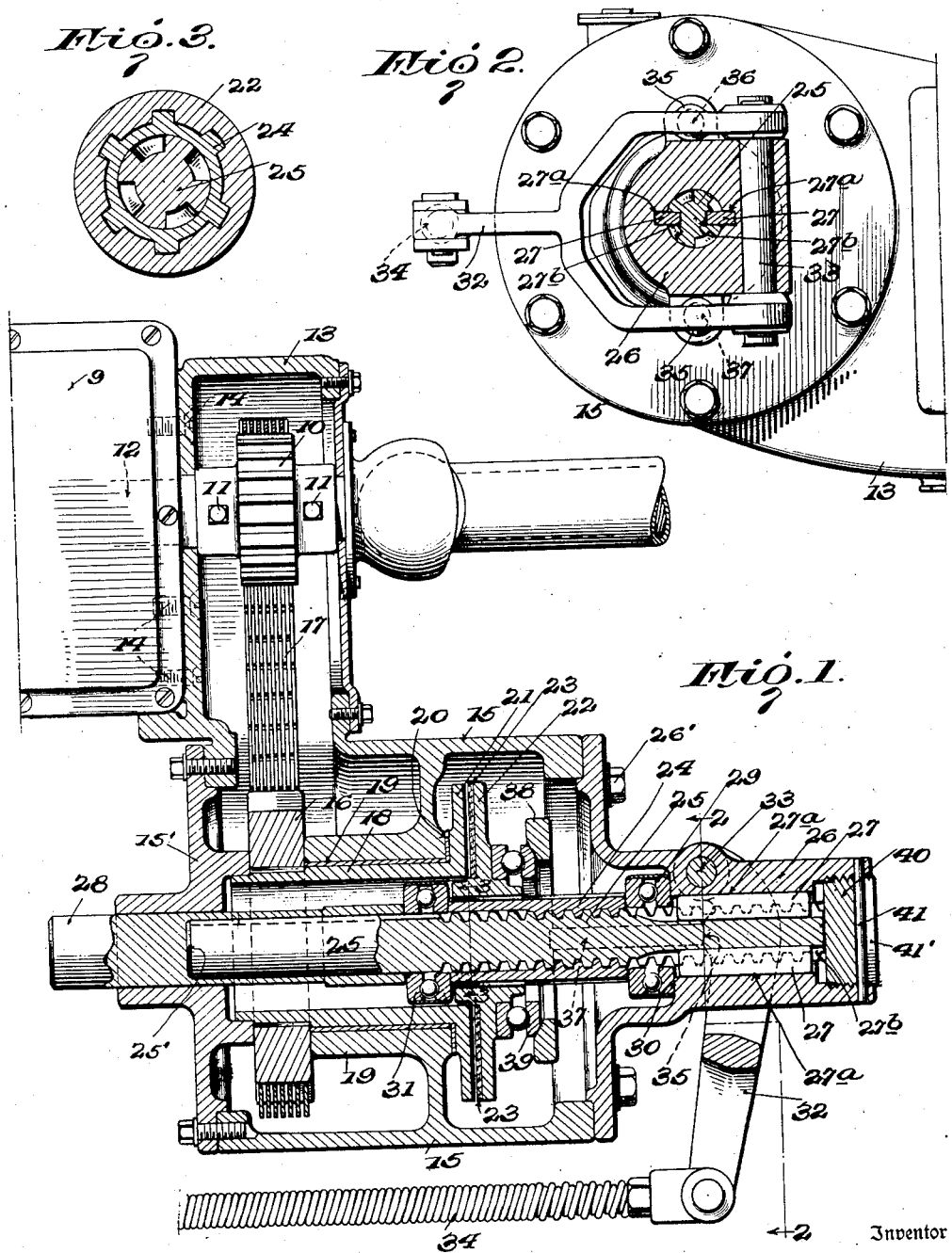
Inventor
Frederick H. Ragan.
By Cameron, Kerkam and Sutton.
Attorneys

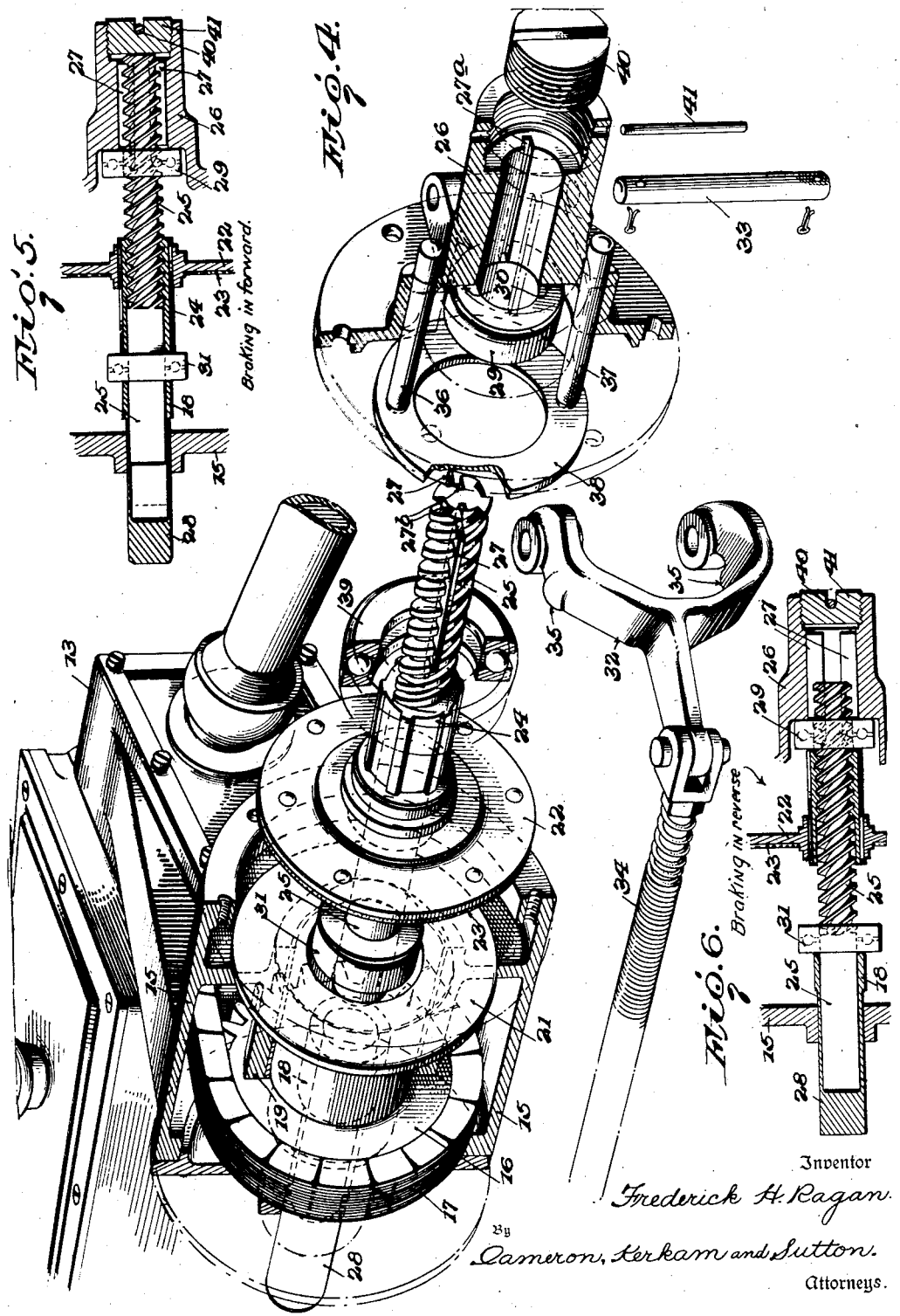

Patented Oct. 18, 1932

1,883,318

UNITED STATES PATENT OFFICE

FREDERICK H. RAGAN, OF CLEVELAND, OHIO

BRAKE OPERATING MECHANISM

Application filed December 27, 1928. Serial No. 328,703.

This invention relates to brake mechanism for automobiles, and more particularly to a power brake operating mechanism in which the brake applying force is derived from the motion of the vehicle, and in which the application of such force is at all times under complete control of the operator.

It is an object of the present invention to provide such a device which is small and compact but powerful, and which is susceptible to accurate and positive control by the operator.

Another object is to provide such a device in which the forces exerted by the parts are symmetrical and balanced with respect to said parts, and in which the parts have large bearing surfaces so that lost motion will not develop during long periods of operation.

Another object is the provision of such a device, the parts of which require no unusual or expensive machining operations.

Another object is to provide such a device which operates equally well whether the vehicle is moving forward or backward.

Another object is to provide such a device which is simple in construction and comprises few moving parts.

Another object of this invention is to provide a power brake operating mechanism which is inexpensive to manufacture, easy to install, efficient in operation, and reliable and durable in service.

Other objects and advantages of this device will be in part obvious, and will become apparent to those skilled in the art through the following description taken in connection with the disclosure in the accompanying drawings, which illustrate a preferred embodiment of the invention.

In the drawings,—

Fig. 1 is a horizontal mid-sectional view of the device shown in assembled relation with an automobile transmission mechanism;

Fig. 2 is a vertical sectional view taken approximately on the line 2—2 of Fig. 1;

Fig. 3 is a vertical sectional detail taken approximately on the line 3—3 of Fig. 1;

Fig. 4 is a perspective view of the device, partly disassembled and partly in section;

Fig. 5 is a vertical sectional detail of the brake operating elements in braking position for forward motion of the vehicle; and Fig. 6 is a similar detail of the brake operating elements in braking position during reverse motion of the vehicle;

Referring first to Fig. 1 of the drawings, 9 indicates a change speed transmission housing of conventional form having a main drive shaft 12 extending rearwardly therefrom, and 10 indicates a driving pinion fixed in any suitable way as by means of set screws 11 upon an extension of said drive shaft 12. A casing 13 is fixed to the rear of the transmission housing 9 by suitable means such as screws 14 so as to enclose the driving pinion 10, and extends laterally to form a housing 15 for the power brake operating mechanism.

A sprocket member 16 is driven from sprocket 10 by means of a silent chain 17 and is keyed in any suitable way upon a hollow shaft 18 suitably journaled within the housing 15, as by means of a bearing 19. Shaft 18 is held from endwise movement by a suitable thrust bearing 20 on the one hand and by the engagement of sprocket 16 with the end of bearing 19 on the other hand. Said shaft 18 is formed at its rear end with a friction clutch member 21, and a cooperating clutch member 22, which constitutes the power member of the brake operating unit, is mounted adjacent thereto and is provided with a friction lining 23 which is adapted to engage the surface of clutch member 21 and be rotated thereby.

Power clutch member 22 is splined upon a driving member in the form of a hollow sleeve 24 which is internally threaded for a portion of its length and is mounted upon a second driving member in the form of a correspondingly threaded shaft 25. Shaft 25 is slidably mounted at one end in a rearwardly extending closure member 26 suitably fixed to housing 15 as by cap screws 26', and is prevented from rotation therein by suitable means such as splines 27 which engage in corresponding keyways 27a and 27b in the closure member 26 and in shaft 25 respectively. The forward end of shaft 25 is telescoped loosely within a driven member in the form of a plunger 28 which is mounted loosely in a forward closure member 15' of housing 15 and which protrudes therefrom into operative relation with the vehicle brake controlling mechanism which may be of conventional construction and is therefore not illustrated.

An antifriction thrust bearing 29 is interposed between the rearward end of the sleeve-nut 24 and a shoulder 30 on the closure member 26, and a second anti-friction thrust bearing 31 is mounted on shaft 25 and interposed between the forward end of sleeve-nut 24 and the inner end of plunger 28. A screw plug 40 is threaded in the end of the closure 26 to form an abutment for the rearward end of shaft 25. This plug is so adjusted that when the parts are in their normal positions the forward end of shaft 25 will seat against the bottom 25' of the opening in plunger 28, as illustrated in Fig. 1 of the drawings. The plug 40 is retained in adjusted position by suitable means such as a pin 41 traversing the closure member and a slot 41' in the plug.

A controlling arm 32 is pivoted on the closure 26 in any suitable way as by means of a pin 33, and is operated from the brake pedal of the vehicle (not shown) by a suitable yielding connection as indicated at 34. The controlling arm 32 is provided with forwardly extending projections 35 adapted to engage the ends of a pair of push bars 36 and 37 which are slidably mounted in the closure member 26. The inner ends of these push bars engage a thrust ring 38 which transmits their pressure through an antifriction thrust bearing 39 to the slidable power clutch member 22.

When it is desired to apply the brakes, force is exerted by the operator through connection 34, arm 32 and push bars 36 and 37 causing the power clutch member 22 to engage the clutch member 21 with a pressure proportionate to said force. If the vehicle is moving forwardly, drive shaft 12 and clutch member 21 are rotating in a counter-clockwise direction, as viewed in Fig. 4, and will impart this rotation to the power member 22 under the control of the force exerted by the operator. Assuming that shaft 25 has a right-hand thread, this rotation of power member 22 will cause the driving sleeve 24 to thread itself forwardly on the driving shaft 25. Since shaft 25 is prevented from moving rearwardly by the abutment 40, the driving sleeve 24 is thus propelled forwardly, moving the driven plunger 28 by means of the thrust bearing 31, as shown in Fig. 5. This forward motion of plunger 28 is caused to apply the brakes by any suitable connecting mechanism, not illustrated.

If the vehicle is moving rearwardly when the operator actuates the clutch, the power member 22 and sleeve 24 rotate clockwise as viewed in Fig. 4, causing shaft 25 to be threaded forwardly through the sleeve-nut 24. Since the sleeve 24 is prevented from rearward motion by thrust bearing 30, the shaft 25 becomes the active driving member and the forward end thereof engages the abutment 25' of driven plunger 28, forcing said plunger forwardly to actuate the brakes as shown in Fig. 6.

It will thus be seen that the sleeve 24 and shaft 25 constitute a pair of driving members which cooperate to actuate the driven plunger 28, one of the driving members being passive when the other is active, and their functions being interchanged when the direction of travel of the vehicle is reversed. It will be understood that the pitch of the threads of driving member 24 and 25 is sufficiently steep so that when the operator releases clutch 21, 22 the pressure of the usual brake-releasing springs, not shown, operating on plunger 28, will rotate the power member 22 backwards and return the parts to their normal positions. The coefficient of friction between the two driving members may be lessened, if desired, by making these members of suitable dissimilar metals such as steel and brass.

It will be understood that the sliding fit between the shaft 25 and the plunger 28 is sufficiently loose to prevent air or oil from becoming trapped within the plunger and hindering the sliding action. Longitudinal grooves 25' shown in Fig. 1 may be formed in either or both of the members to prevent any such dash-pot action if deemed desirable.

Although but one embodiment of the invention has been shown and described in detail, it is to be expressly understood that the illustrated embodiment is not exclusive, and various other embodiments will now suggest themselves to those skilled in the art, while changes may be made in the construction, arrangement and proportions of parts, and certain features used without other features, without departing from the spirit of the invention. Reference is therefore to be had to the claims hereto appended for a definition of the limits of the invention.

I claim:

1. In a power brake operating mechanism for motor vehicles, a force multiplying unit including a driven member, a pair of driving members cooperating to actuate the driven member in one direction by relative motion between the driving members in either direction, means continuously under the control of the operator for moving one driving member from a rotating part, and means independent of the driven member for restraining similar movement of the other driving member.

2. In a brake operating mechanism a force multiplying unit including a driven member, a pair of driving members cooperating to move the driven member in one direction by relative rotation between the driving members in either direction, means continuously under the control of the operator for rotating one driving member, and means independent of the driven member for preventing rotation of the other driving member.

3. In a power brake operating mechanism for motor vehicles, a force multiplying unit including a casing, a pair of driving members so connected that relative rotation causes relative translation thereof, one driving member having an extended portion non-rotatably mounted in the casing, means continuously under the control of the operator for rotating the other driving member from a rotating part, thrust means abutting one end of each driving member, and a driven member in abutting relation with the other end of both driving members.

4. In a power brake operating mechanism for motor vehicles, a force multiplying unit including a casing, a pair of driving members so connected that relative rotation in either direction causes relative translation in opposite directions, one driving member having an extended portion non-rotatably mounted in the casing, means continuously under the control of the operator for rotating the other driving member from a rotating part, said casing being arranged to take the thrust of the driving members in one direction, and a driven member adapted to be actuated by the thrust of either driving member in the opposite direction.

5. In a brake operating mechanism, a force multiplying unit including a casing, a driving member mounted therein for free longitudinal movement thereof, said casing and driving member having means for preventing rotation of the driving member in the casing, a rotatable driving member connected to said first named driving member so that relative rotation thereof in either direction causes relative longitudinal motion in opposite directions, a driven member, and means whereby the driven member is actuated in one direction by relative longitudinal motion of the driving members in either direction.

6. In a power brake operating mechanism for motor vehicles, a force multiplying unit including a casing, a rotatable power member, a pair of driving members splined respectively to the casing and power member and connected so that relative rotation causes relative longitudinal motion, a driven member, and means whereby the driven member is actuated by relative longitudinal motion of the driving members.

7. In a power brake operating mechanism for motor vehicles, a force multiplying unit including a casing, a power member, means continuously under the control of the operator for rotating the power member from a rotating part, a pair of driving members splined respectively to the casing and power member and connected so that relative rotation in either direction causes relative longitudinal motion in opposite directions, a driven member, and means whereby the driven member is actuated in a direction to apply the brakes by relative longitudinal motion of the driving members in either direction.

8. In a brake operating mechanism for motor vehicles, a pair of driving members, a driven member, means continuously under the control of the operator for rotating one driving member and means whereby said rotation causes one or the other of the driving members depending on the direction of rotation of said one driving member to actuate the driven member for applying the brakes.

9. In a brake operating mechanism, a pair of driving members, a driven member, means for rotating one driving member, means for restraining rotation of the other driving member, said driving members being so connected that relative rotation causes relative longitudinal movement thereof, means for preventing longitudinal movement of both driving members in one direction, and means whereby longitudinal movement of either driving member in the opposite direction will actuate the driven member.

10. In a brake operating mechanism, a pair of driving members, a driven member, means for rotating one driving member while allowing longitudinal movement thereof, means for restraining rotation of the other driving member, while allowing longitudinal movement thereof, said driving members being so connected that relative rotation causes relative longitudinal movement thereof, and means whereby longitudinal movement of either driving member is caused to actuate the driven member.

11. In a power brake operating mechanism for motor vehicles, a casing, a driving shaft splined therein, a hollow driving sleeve threaded on said splined shaft, a power clutch member splined on said hollow sleeve and adapted to cooperate with a clutch member driven from a rotating part of the vehicle, abutments in said casing for preventing longitudinal movement of both said shaft and sleeve in one direction, and a driven plunger in abutting relation with both said shaft and sleeve and adapted to be operated by longitudinal movement thereof.

12. In a power brake mechanism for motor vehicles, a casing, a threaded driving member mounted for longitudinal movement therein, a hollow driving sleeve threaded therein, a power member splined to said hollow sleeve and adapted to be rotated from a rotating part of the vehicle, abutments for preventing longitudinal movement of the threaded driving member and sleeve in one direction, means to restrain rotation of said threaded driving member to cause longitudinal movement thereof upon rotation of the power member in one direction and longitudinal movement of the sleeve thereon upon rotation of the power member in the opposite direction, a driven member, and connections between the threaded driving member and sleeve and said driven member whereby said driven member is moved longitudinally by the cooperation of said threaded driving member and sleeve in either direction of rotation of said power member.

13. In a brake operating mechanism, a pair of driving members, a driven member, means independent of the driven member whereby rotation of a driving member in one direction causes translation of one driving member while the other remains longitudinally fixed and serves to take the reaction of the translational forces, and whereby rotation in the opposite direction will cause translation of the second driving member while the first driving member remains longitudinally fixed and serves to take the reaction of the translational forces, and means whereby such translation of either driving member actuates the driven member to apply the brakes.

In testimony whereof I have signed this specification.

FREDERICK H. RAGAN.